US008047224B2

(12) United States Patent
Eichler

(10) Patent No.: US 8,047,224 B2
(45) Date of Patent: *Nov. 1, 2011

(54) CARTRIDGE INSERT VALVE

(76) Inventor: Donald Gary Eichler, Edmond, OK (US)

( * ) Notice: Subject to any disclaimer, the term of this patent is extended or adjusted under 35 U.S.C. 154(b) by 873 days.

This patent is subject to a terminal disclaimer.

(21) Appl. No.: 12/101,402

(22) Filed: Apr. 11, 2008

(65) Prior Publication Data

US 2008/0185047 A1 Aug. 7, 2008

Related U.S. Application Data

(63) Continuation-in-part of application No. 11/266,457, filed on Nov. 3, 2005, now Pat. No. 7,380,565, which is a continuation-in-part of application No. 11/220,080, filed on Sep. 6, 2005, now Pat. No. 7,258,131.

(60) Provisional application No. 60/707,908, filed on Aug. 12, 2005.

(51) Int. Cl.
*F16K 51/00* (2006.01)

(52) U.S. Cl. ............. 137/454.2; 137/460; 137/504

(58) Field of Classification Search ............. 137/504, 137/498, 460, 269.5, 1, 517, 454.2, 454.6; 73/1.16; 251/63
See application file for complete search history.

(56) References Cited

U.S. PATENT DOCUMENTS

| 2,744,727 | A | * | 5/1956 | Osburn | 137/454.2 |
|---|---|---|---|---|---|
| 3,794,077 | A | | 2/1974 | Fanshier | |
| 4,128,105 | A | * | 12/1978 | Follett | 137/1 |
| 4,319,604 | A | * | 3/1982 | Bird | 137/498 |
| 4,878,648 | A | * | 11/1989 | Strassheimer | 251/63 |
| 5,000,031 | A | * | 3/1991 | Potvin | 73/1.16 |
| 5,215,113 | A | * | 6/1993 | Terry | 137/460 |
| 5,280,806 | A | | 1/1994 | Glazebrook | |
| 5,613,518 | A | | 3/1997 | Rakieski | |
| 5,704,391 | A | | 1/1998 | McGowan, Jr. et al. | |
| 5,921,271 | A | * | 7/1999 | Thomas et al. | 137/269.5 |
| 5,983,928 | A | | 11/1999 | Hsiao | |
| 6,199,583 | B1 | | 3/2001 | Iacovella | |
| 6,357,415 | B1 | | 3/2002 | Mori | |
| 6,363,963 | B1 | | 4/2002 | White | |
| 6,390,199 | B1 | | 5/2002 | Heijnen | |
| 6,405,751 | B1 | | 6/2002 | Hsiao | |
| 6,792,972 | B2 | | 9/2004 | Poulsen | |
| 6,857,440 | B2 | | 2/2005 | Lind | |
| 7,111,638 | B2 | * | 9/2006 | Johnson | 137/460 |
| 7,258,131 | B2 | * | 8/2007 | Eichler | 137/460 |
| 7,562,668 | B2 | | 7/2009 | Mackay-Smith et al. | |

* cited by examiner

*Primary Examiner* — John Rivell
*Assistant Examiner* — Minh Le
(74) *Attorney, Agent, or Firm* — Martin A. Weeks

(57) ABSTRACT

The present invention is for a cartridge insert valve to limit excess flow through a pipe which is part of a piping system. The cartridge insert valve includes a cylindrical housing and an inlet cap with an inlet opening defined therein. The inlet cap is positioned on a cylindrical housing first end. The cartridge insert valve also includes a seat cap with an orifice defined therein. The seat cap is positioned on a cylindrical housing second end opposite the cylindrical housing first end. The cartridge insert valve is located in the pipe such that a fluid flowing through the pipe normally enters the inlet cap, flows through the cylindrical housing and exits the seat cap. The cartridge insert valve also includes a piston assembly that shuts off flow through the valve in response to an excess flow through the valve.

18 Claims, 10 Drawing Sheets

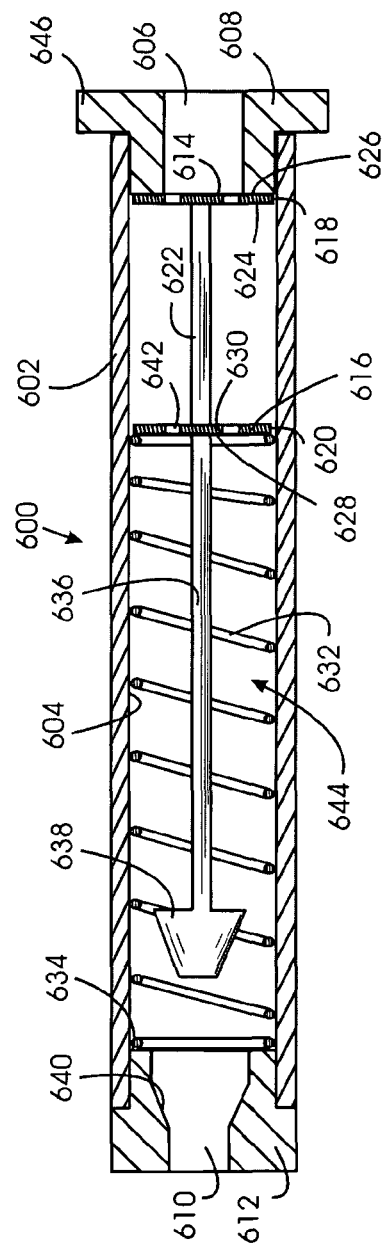
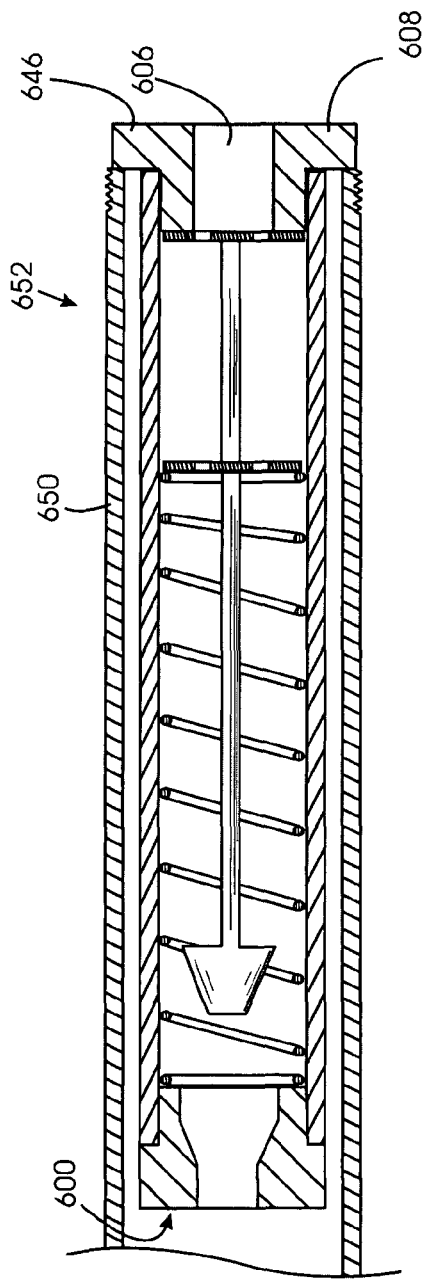
FIG. 12
FIG. 13

CARTRIDGE INSERT VALVE

CROSS-REFERENCE TO RELATED APPLICATIONS

This application relates to Provisional Application No. 60/707,908 filed Aug. 12, 2005, and is a continuation-in-part application of U.S. patent application Ser. No. 11/266,457 filed Nov. 3, 2005, now U.S. Pat. No. 7,380,565, which is a continuation-in-part application of U.S. patent application Ser. No. 11/220,080 filed on Sep. 6, 2005, now issued as U.S. Pat. No. 7,258,131.

BACKGROUND OF THE INVENTION

Safety valves or excess flow valves have been developed in the past for installation in gas piping systems to shut down the flow of gas whenever there is an excess flow of gas that may indicate a leak or other problem. For new gas piping systems, the system can be easily designed to accommodate the safety valves. However, to retrofit a safety valve into an existing gas piping system, the installation requires cutting the existing pipe and installing the safety valve in place of a length of pipe in the piping system.

Replacing sections of pipe can be cumbersome, particularly when the pipe is located in an inconvenient location. Furthermore, replacing sections of pipe can add a significant amount of labor cost to the installation. Thus, it is desirable to install the safety valve without having to replace sections of pipe in the piping system.

It is to solving these problems and others that the present invention is directed.

BRIEF SUMMARY OF THE INVENTION

The present invention is for a cartridge insert valve to limit excess flow through a pipe which is part of a piping system. The cartridge insert valve includes a cylindrical housing and an inlet cap with an inlet opening defined therein. The inlet cap is positioned on a cylindrical housing first end. The cartridge insert valve also includes a seat cap with an orifice defined therein. The seat cap is positioned on a cylindrical housing second end opposite the cylindrical housing first end.

The cartridge insert valve is located in the pipe such that a fluid flowing through the pipe enters the inlet cap, flows through the cylindrical housing and exits the seat cap. The cartridge insert valve also includes a piston assembly that shuts off flow through the valve in response to an excess flow through the valve.

BRIEF DESCRIPTION OF THE DRAWINGS

FIG. 12 is a partial cross-sectional view of a cartridge insert valve constructed in accordance with a preferred embodiment of the present invention.

FIG. 13 is a partial cross-sectional view of the cartridge insert valve of FIG. 12 installed in a segment of pipe.

It is noted that the cross-hatching of a cross section is not intended to indicate the use of a particular material for any of the drawings.

DESCRIPTION

Figure 1:
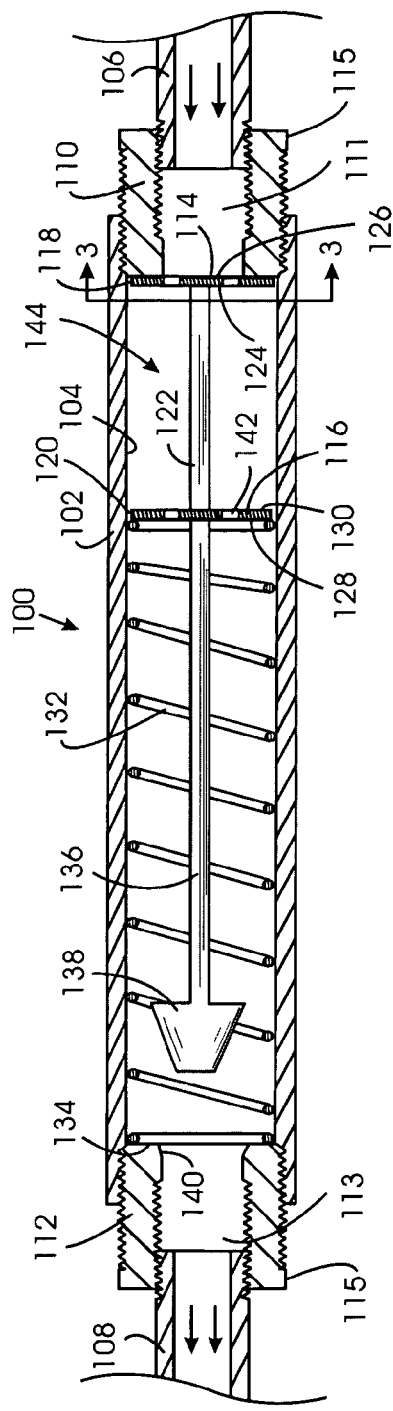
FIG. 1 is a partial cross-sectional view of a safety valve positioned in the open position constructed in accordance with a preferred embodiment of the present invention.
Figure 2:
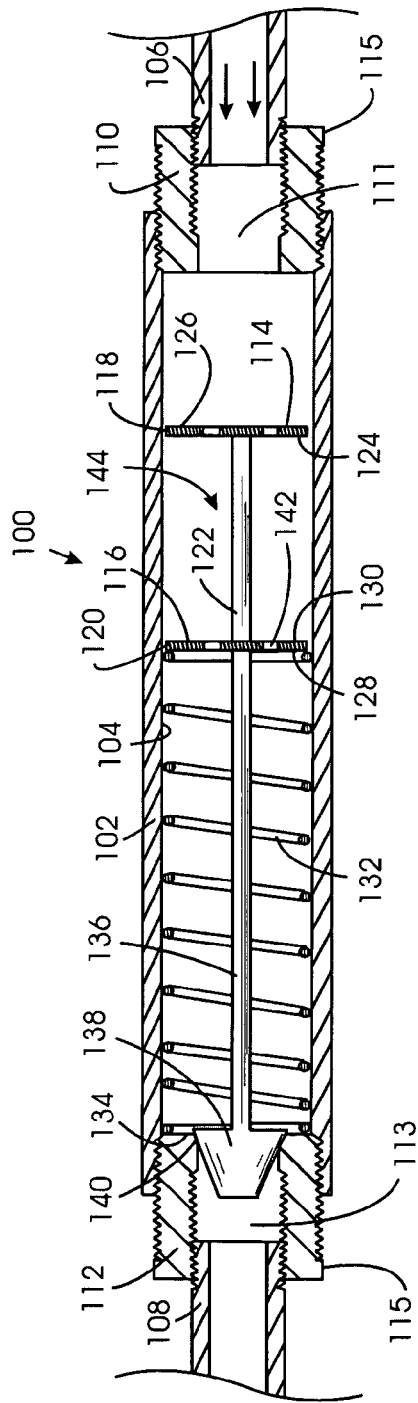
FIG. 2 is a partial cross-sectional view of a safety valve positioned in the closed position constructed in accordance with a preferred embodiment of the present invention.

FIGS. 1-2 show cross-sectional views of a safety valve 100. FIG. 1 shows the safety valve 100 in an open position and FIG. 2 shows the safety valve 100 in a closed position. The safety valve 100 includes a housing 102 with an inner wall 104. The housing 102 is made from a pipe of larger diameter than a diameter of inlet piping 106 upstream of the safety valve 100 and a diameter of outlet piping 108 downstream of the safety valve 100. The safety valve 100 is connected to the inlet piping 106 by an inlet coupler 110 and to the outlet piping 108 by an outlet coupler 112. Fluid flows through an inlet passage 111 defined in the inlet coupler 110, into the housing 102 and, when the safety valve 100 is in the open position, though an outlet passage 113 defined in the outlet coupler 112. The inlet coupler 110 and the outlet coupler 113 each have a hexagonal portion with six flat sides 115 to accommodate a standard wrench.

A disc-shaped first piston 114 and a disc-shaped second piston 116 are positioned in the housing 102, with piston outer walls 118 and 120 having diameters slightly smaller than a diameter of the housing inner wall 104. There are gaps between the piston outer walls 118 and 120 and the housing inner wall 104 that are generally small, but large enough to allow for free sliding of the pistons 114 and 116 within the housing 102. The pistons 114 and 116 are separated by a shaft 122 of length $L_{SH}$. The first piston 114 has a downstream face 124 and an upstream face 126. The second piston 114 has a downstream face 128 and an upstream face 130.

A spring 132 is positioned in the housing 102 between an outlet coupler inner face 134 and the downstream face 128 of the second piston 116. The spring 132 resiliently restrains the sliding of the pistons 114 and 116 in the direction of the outlet coupler inner face 134. The spring 132 has a spring constant K and a length $L_{SP}$.

A valve stem 136 of length $L_{VS}$ extends from the second piston downstream face 128 to support a stop 138. The valve stem 136 is attached at a first end to the second piston 116 and at a second end to the stop 138. As shown in FIGS. 1 and 2, the stop 138 may be integrally formed with the valve stem 136, such as in a casting. The stop 138 may also be a separate piece attached to the valve stem 136. The valve stem 136 is rigidly attached to the second piston 116 so that movement of the second piston 116 causes a like movement of the valve stem 136 and the stop 138. A valve seat 140 is defined in the outlet coupler 112. The valve seat 140 is shaped and sized to receive the stop 138 to form a substantial fluid seal between the stop 138 and the valve seat 140.

Figure 3:
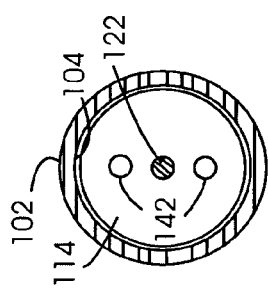
FIG. 3 is the cross-section 3-3 shown in FIGS. 1 and 2.

As best seen in FIG. 3, orifices 142 are defined in the first piston 114. There are two orifices 142 shown in FIG. 3, but if more orifices 142 are required, it is recommended that the orifices 142 be spaced equally about the circular first piston 114. For example, if three orifices 142 are required, the orifices 142 should be spaced with centers at one hundred-twenty degree angles from one another, and with a center of each orifice 142 having the same distance from a center of the first piston 114. The symmetry of the orifices 142 in each piston 114 and 116 is recommended so that the fluid flow field across a diameter of the housing 102 does not develop asymmetries. The second piston 116 generally has orifices 142 defined in positions identical to the first piston 114, but more or less orifices 142 may be provided in the second piston 116 if so desired.

A piston assembly 144 is defined to include the first piston 114, the second piston 116, the shaft 122, the valve stem 136 and the stop 138. The orifices 142 are defined in the piston 114 and 116 to allow the flow of fluid past the pistons 114 and 116 under normal operating conditions. The selection of the size and the number of orifices 142 is discussed below in greater detail.

For the embodiment shown in FIGS. 1-2, the valve seat 140 is made from the outlet coupler 112 that has been externally threaded to fit into internal threads defined in the safety valve outer wall 104. The valve seat 140 has been chamfered to form a geometry that more closely matches that of the stop 138, thus forming a tighter seal between the stop 138 and the valve seat 140.

In one embodiment, the stop 138 and the valve seat 140 have metallic surfaces. Thus, when the stop 138 moves into the valve seat 140, the seal formed by the stop 138 and the valve seat 140 is not an absolute seal. However, the seal so formed substantially blocks the flow of fluid into the outlet piping 108 until a shutoff valve upstream of the safety valve 100 can be closed.

In another embodiment, at least one of the stop 138 and the valve seat 140 are made from a resilient material so that a tighter seal is formed between the stop 138 and the valve seat 140. However, the resilient material selected for the stop 138 or the valve seat 140 must not degrade over time in the presence of the fluid in the piping system. Such resilient materials may include rubber, polymers, plastics, or fibrous material.

The materials generally used to make components for the safety valve 100 may be any suitable material for the transport of the fluid. In the case where the fluid is natural gas, such materials as steel, stainless steel, aluminum, copper, brass and various alloys thereof may be used. Generally, it is expected that the safety valve 100 may be in a natural gas pipeline for decades without the piston assembly being moved to the closed position. Thus, it is highly desirable for the material selected for use be resistant to rust and corrosion. Such materials include aluminum, stainless steel, composites and alloys thereof. Special consideration in the selection of materials must also be made when the valve is used in a high temperature or a low temperature environment and when the fluid flowing through the safety valve has a high or low operating temperature. In some applications involving high precision, the piston assembly may be made from light-weight carbon fiber materials.

In other applications, such as water transport, the safety valve 100 may also be made of the metallic materials listed above, but also may be made from plastic, polymers, or composite materials.

In operation, an excess flow rate caused by a leaky appliance or a catastrophic failure of piping downstream of the safety valve 100 creates a loss of pressure downstream of the safety valve 100, which in turns creates a pressure difference between the upstream piping 106 and the downstream piping 108. This pressure difference causes the pistons 114 and 116 to slide in a direction aligned with the fluid flow through the safety valve 100. Thus, the piston 116 is pushed toward the valve seat 140 by the fluid flow forces, with the fluid forces exerted on the pistons 114 and 116 being counteracted by the force exerted by the spring 132 on the second piston 116. When the piston 116 moves toward the outlet coupler 112, the stop 138 in turn moves toward the valve seat 140. As shown in FIG. 1, the stop 138 is generally frustro-conical in shape. However, the stop 138 may be any shape so long as it is shaped and sized to matingly engage the valve seat 140. When the pressure difference between the inlet piping 106 and the outlet piping 108 exceeds a critical pressure difference, the stop 138 seats in the valve seat 140, the safety valve 100 is in a closed position and fluid flow through the safety valve 100 stops, as represented in FIG. 2.

It is well known that a breaker box for an electrical supply line shut off the supply to an electrical circuit provided to a house when the current exceeds a certain level. Similarly, the safety valve 100 closes when the flow rate through the valve exceeds a certain critical flow rate.

The use of the first piston 114 and the second piston 116 spaced apart by a shaft 122 allows one to use a much lighter piston assembly, as compared to a solid-body piston with elongated holes, as taught by U.S. Pat. No. 5,215,113, issued to Terry on Jun. 1, 1993 (Terry). Because the pistons 114 and 116 are disc-shaped, it is also much easier to drill through the pistons 114 and 116 to create the orifices 142, as compared to the difficulty for drilling holes in the solid-body piston.

The use of two spaced-apart pistons 114 and 116 attached to a shaft 122 is a more stable structure, with respect to keeping the valve stem 136 and the stop 138 in the middle of the housing 102, as compared with using a single disc-shaped piston with a valve stem and stop. Generally, it is expected that the two disc-shaped pistons 114 and 116 will have less friction with the inner walls of the housing 104 than would the outer edges of the solid-body piston assembly taught by Terry, because the two spaced-apart pistons 114 and 116 would generally have less of a total surface area in contact with the housing inner wall 104.

Another advantage over the solid-body piston is that two disc-shaped, spaced apart pistons are much lighter than a solid body occupying the same volume. This is particularly important when the safety valve 100 is used in an application requiring high precision in low pressure gas pipes. These applications occur, for example, when one wishes to monitor home appliances for excess gas flow.

For these applications, one wishes to know when excess gas is flowing to an appliance because it may indicate a leak in the appliance or one of the appliance's gas fittings. By using a low-mass piston assembly in conjunction with a very low spring constant, the safety valve 100 may be used to sense and respond to very small changes in pressure. It is well known in fluid mechanics that for a given flow geometry and fluid, the pressure can be directly correlated to a flow rate. Thus, the safety valve 100 may be designed to shut down the flow when a small increase in gas flow rate occurs downstream of the safety valve.

Reducing the mass of the piston assembly makes the safety valve 100 more sensitive to small pressure changes in part because the fluid forces acting on the piston assembly 144 must overcome inertia to move the piston assembly 144 from the open position to the closed position. Reducing the mass of the piston assembly 144 would clearly lessen the amount of force required to overcome the inertia of the piston assembly 144.

It is also recommended that, for applications requiring high precision, the safety valve 100 should be installed on piping in the horizontal position. Otherwise, the weight of the piston assembly 144 may affect the flow rate at which the safety valve wilt close. If the valve is installed in a vertical position, the weight of the piston assembly 144 must be accounted for in selecting a spring 132 and an orifice size 142 for the first piston 114 and the second piston 116.

Figure 4:
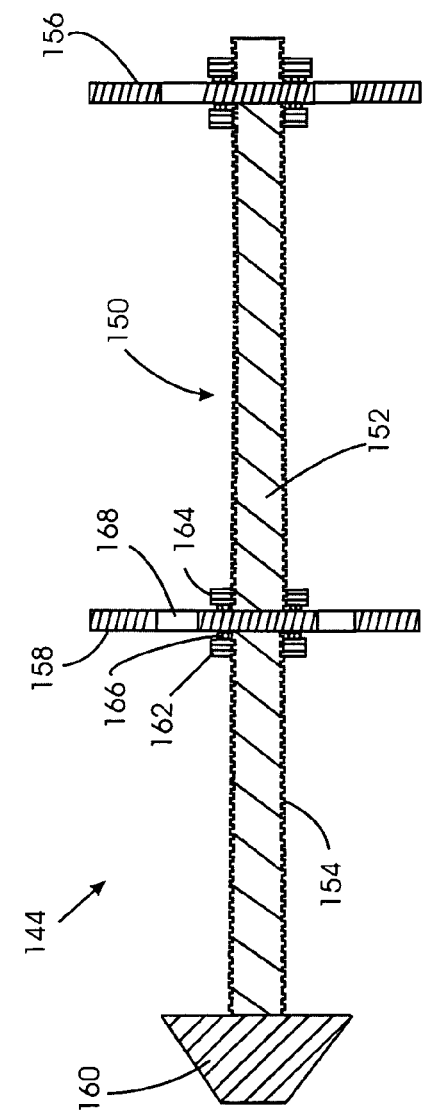
FIG. 4 is a cross-sectional view of a piston assembly constructed in accordance with a preferred embodiment of the present invention.

FIG. 4 shows a cross sectional view of another embodiment of the piston assembly 144 of the safety valve 100. In this embodiment, the piston assembly 144 is made from generally off-the-shelf mechanical hardware and piping hardware. In FIG. 4, a threaded rod 150 is used to form a threaded shaft 152 and a threaded valve stem 154 for the safety valve 100. A first flat washer 156 and a second flat washer 158 acts as the pistons 114 and 116 shown in FIGS. 1-3. An internally threaded nose cone 160 screws onto an end of the threaded rod to act as the stop 138 to fit matingly with the valve seat 140. The flat washers 156 and 158 are secured on the threaded rod 150 by tightening a first nut 162 against a second nut 164 on the threaded rod 150, with two lock washers 166 and one of the flat washers 156 and 158 positioned between the two nuts 162 and 164.

The flat washers 156 and 158 have holes 168 defined therein through which fluid flows. In operation, the threaded rod 150 acts identically to the valve stem and shaft shown in FIGS. 1-2, with the flat washers 156 and 158 being the first piston 114 and the second piston 116. The nose cone 160 acts identically to the stop 138 of FIGS. 1-2 to matingly engage the valve seat 140 to stop the fluid flow when the force exerted by the fluid on the flat washers 156 and 158 sufficiently exceeds the force exerted by the spring 132.

Figure 5:
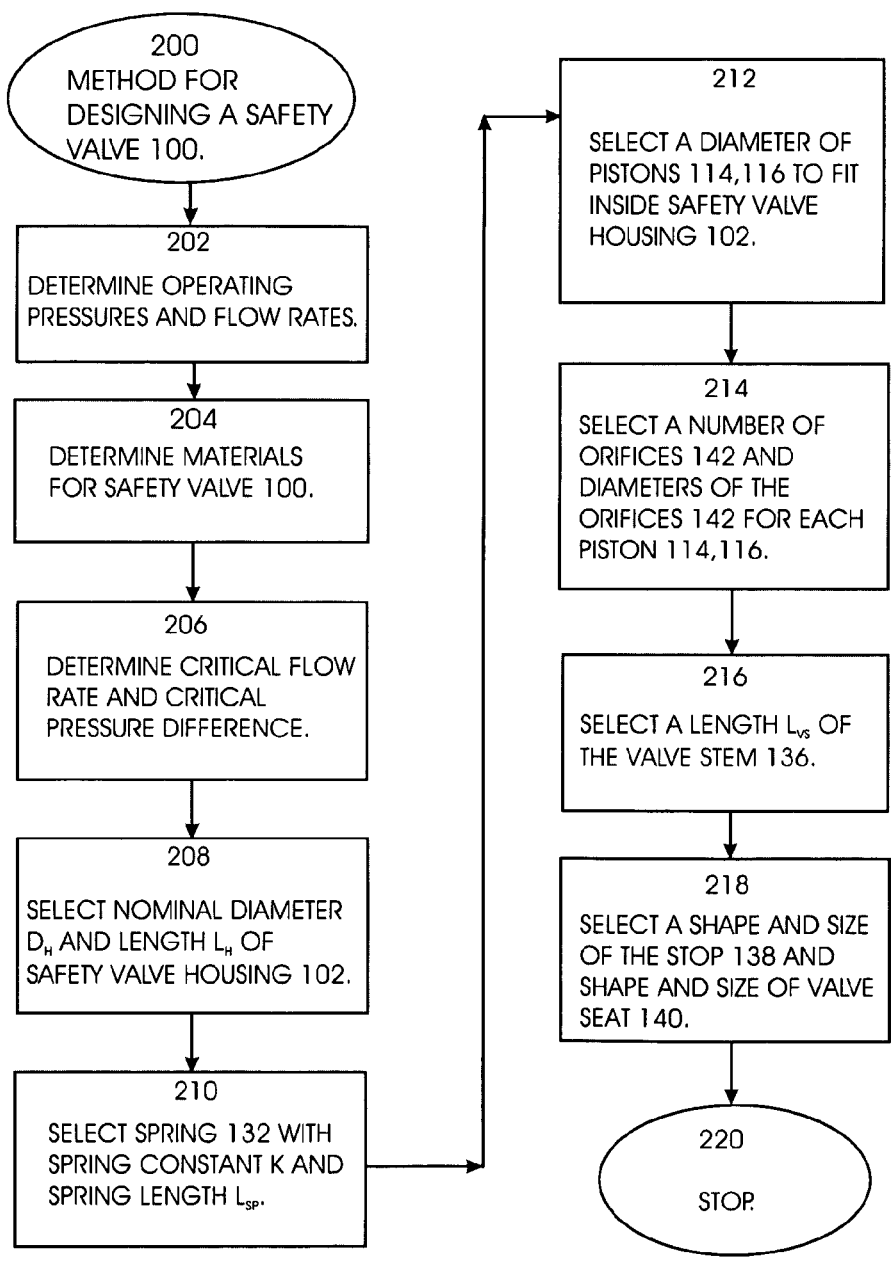
FIG. 5 is a flow chart for designing a safety valve in accordance with a preferred embodiment of the present invention.

FIG. 5 shows a flow chart for a method for designing the safety valve 100 of the present invention. For this flow chart, the steps of the method may be carried out in any order except where one step necessarily precedes another step. The method begins at step 200.

At step 202, a designer specifies the normal operating conditions for the safety valve 100, such as the pipeline size, the fluid flowing in the pipeline and a range of normal pipeline pressures and normal flow rates. At step 204, the designer specifies the material to be used for the safety valve 100 based on the fluid flowing in the pipeline. At step 206, given the normal operating conditions, the designer specifies a desired critical pressure difference between the pressure upstream and downstream of the safety valve 100, above which the safety valve 100 is designed to close. The designer may also express this critical pressure difference as a critical flow rate based on predetermined correlations and measurements.

At step 208, the designer selects a safety valve housing nominal diameter $D_H$ and length $L_H$. At step 210, the designer selects a spring 132 with spring constant K and length $L_{SP}$. The spring length $L_{SP}$ is selected so that the spring 132 is under a slight compression or "preload" when the spring 132 and piston assembly 144 are assembled in the housing. The exact amount of the preload will vary depending on the particular application. At step 214, the designer selects two pistons, each having a diameter slightly smaller than the internal diameter of the housing 102. At step 216, the designer selects a number N of orifices 142 having diameters of $D_O$. For a safety valve 100 of a given size, the selection of the number of orifices 142, the orifice diameter $D_O$, and the spring constant K determine the critical pressure difference and the critical flow rate at which the safety valve 100 will close.

The spring length $L_{SP}$ and the spring constant K will determine the stroke S that the pistons will travel between open and closed positions of the valve for a given housing length L. The stroke S should be of a sufficient length to prevent the safety valve 100 from repeatedly opening and closing when the pressure difference across the safety valve is near the critical pressure difference. The design of the piston assembly 144, with a relatively long valve stem length $L_{vs}$ and a relatively long spring length $L_{SP}$ prevent the valve from opening and closing when the valve is operating near the critical pressure difference and critical flow rate. Generally, the stroke S should be nominally 15-20% of the uncompressed length $L_{SP}$ of the spring 132, and should in all cases be less than one third of $L_{SP}$. The purpose of this restriction on the stroke S is to ensure that the spring 132 deflects only in the linear range, so that the deflection of the spring 132 as a function of force can be reliably determined.

In selecting the number of orifices 142 and the orifice size $D_O$, it is also generally desirable to minimize the pressure drop across the safety valve 100 with the safety valve 100 in the open position while insuring reliable operation of the safety valve 100. It is expected that this pressure drop will increase with decreasing size of the orifice 142, but this is a general rule subject to exceptions for particular designs.

In one embodiment, the first piston 114 has more than two orifices 142 and the second piston 116 has two orifices 142, and the size of the orifices 142 in the first piston 114 is smaller than the size of the orifices 142 in the second piston 116. In this embodiment, the first piston 114 acts as a filter to remove to remove contaminants from the fluid stream. In another embodiment, a fluid screen is placed in the pipeline upstream of the safety valve to remove contaminants before they reach the safety valve 100. When the fluid being pumped through the pipeline is known to have contaminants, it is important to have a mechanism to remove the contaminants or the contaminants may block the orifices 142.

As a rule of thumb, it has been found that the safety valve 100 operates well for a gaseous fluid when a sum of the areas of all the orifices 142 is 2 to 3 times less than the area of the inlet passage 111. Furthermore, it is generally believed that two orifices 142 on each piston 114 and 116 are sufficient for proper operation of the safety valve 100 in a gas pipeline.

At step 216, the designer must specify the length $L_{vs}$ of the valve stem 136. The length $L_{vs}$ of the valve stem 136 is selected so that the spring 132 fits between the second piston 116 and the outlet coupler inner face 134, applying a predetermined force to the second piston 116 to prevent the stop 138 from engaging the valve seat 140. Finally, at step 218, the designer specifies the shape of the stop 138 and valve seat 140. The method ends at step 220.

Following the method for designing a safety valve 200, a manufacturer may conduct tests and generate a series of tables to make the selection of the safety valve 100 simply a matter of looking up in a table which safety valve 100 is required for a particular application. The designer may choose many of the design criteria based on experience, rules of thumb, and other imprecise rules of design. However, assuming that all the other criteria are determined, the choices of the number of orifices, the orifice diameters and the spring constant will determine the critical flow rate at which the safety valve 100 will close For a first example, assume that all the design criteria are known except the orifice size and spring constant are known. Table 1 provides an example of the type of correlation between the orifice size, the number of orifices 142, and the spring constant K. One can look at Table 1 and determine the orifice size required for the safety valve to close at the desired critical flow rate for various combinations of spring constant and the number of orifices.

Another example of the type of correlation that can be determined experimentally is shown in Table 2. For Table 2, it is assumed that all the other design criteria have been specified except the orifice size, the critical flow rate, and the spring constant. From Table 2, if one is given a particular orifice size and a critical flow rate, one can then determine the spring constant to use to cause the safety valve to close at that critical flow rate.

It must be noted that none of the actual numerical values given by Tables 1 and 2 have yet been determined. These tables are only meant to demonstrate the types of experimental correlations that a manufacturer can provide to designers to assist designers in the design of the safety valve 100 for particular applications.

Figure 6:
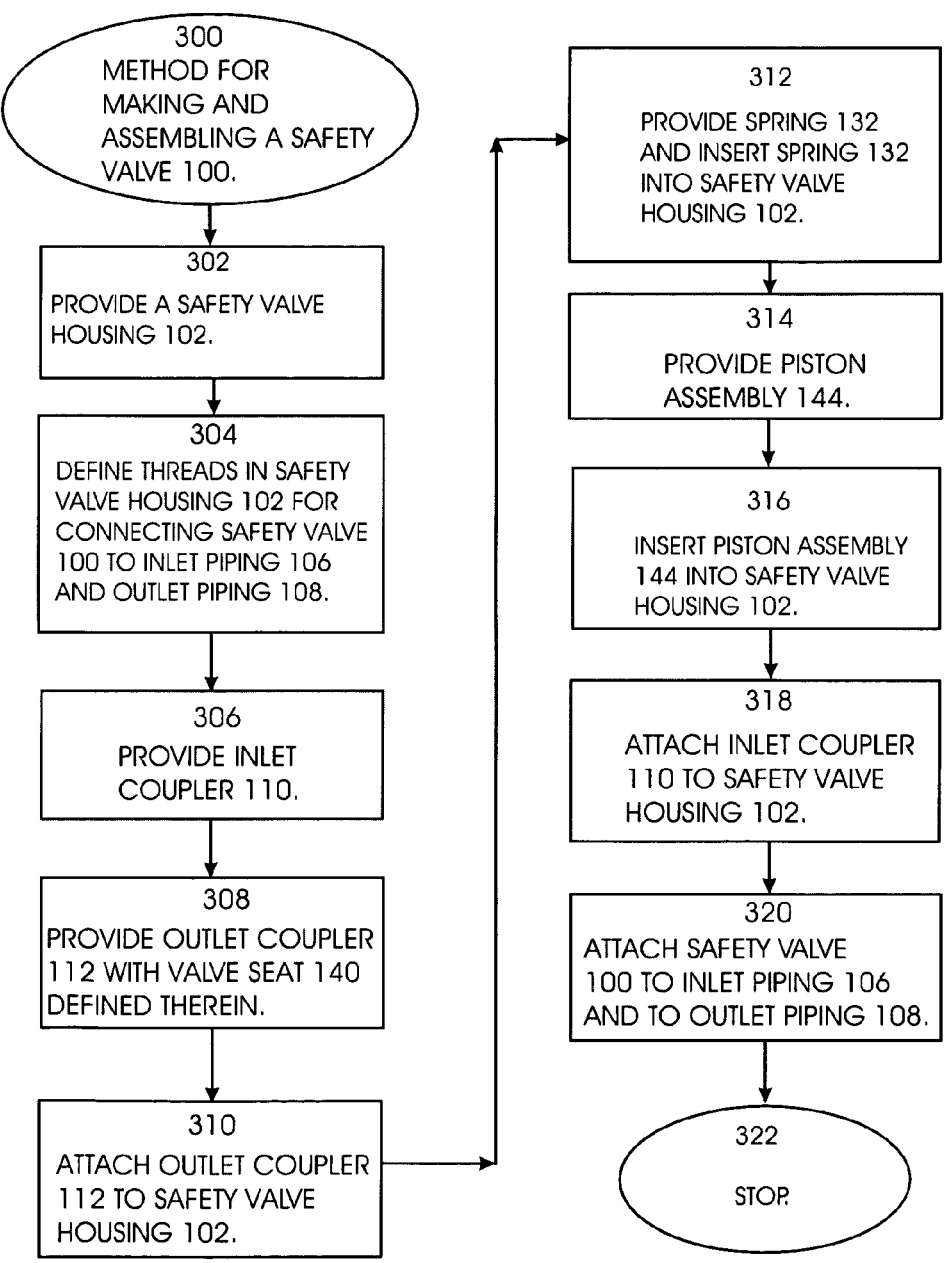
FIG. 6 is a flow chart for making and assembling a safety valve in accordance with a preferred embodiment of the present invention.

FIG. 6 shows a flow chart for a method of making and assembling the safety valve 100. The flow chart begins at step 300. The steps for the method of making and assembling the safety valve may be performed in any order, except where one step necessarily follows another step. At step 302, the person making and assembling the safety valve 100 (maker) provides a safety valve housing 102 larger than the size of the piping to which the safety valve 100 is attached. The safety valve housing 102 is a length of pipe made from a material suitable for the fluid being transported in the piping.

At step 304, threads are defined in the safety valve housing 102. The threads may be internal or external threads. As shown in FIGS. 1-2, the threads on the safety valve housing 102 that attach the housing to the inlet and outlet couplers 10 and 112 are internal. At step 306, the maker provides an inlet coupler 110 to connect the safety valve housing 102 to the inlet piping 106.

For the embodiment shown in FIG. 1-2, the inlet coupler 110 and the outlet coupler 112 are: (1) externally threaded on one end to connect to the internal threads on the housing and (2) are internally threaded on the other end to connect to externally threaded inlet and outlet piping. For the case where the safety valve is retrofitted to an existing fluid line, one would expect to cut a section of the existing fluid line in two places, remove the section of fluid line between the two cuts, thread ends of the existing fluid line where the cuts have been made, and install the safety valve. Various pipe couplers are available for: (1) connecting two externally threaded sections of pipe; (2) to connect an internally threaded pipe to another internally threaded pipe; or to (3) connect an externally threaded pipe to an internally threaded pipe. The choice of whether to use internal or external threads will depend largely on the application for which the piping is being used.

At step 308, the maker provides an outlet coupler 112. In some embodiments, the outlet coupler 112 is made of cast material, such as aluminum and a valve seat 140 is shaped and sized in the outlet coupler 112 when the outlet coupler 112 is cast to matingly receive the stop 138. In other embodiments, the outlet coupler 112 is provided as an off-the-shelf item from a hardware supplier. For this embodiment, the valve seat 140 is defined in the outlet coupler 112 by using appropriate tools to chamfer an edge of a the outlet passage 113 until a portion of the valve seat is conical in shape to matingly receive the stop 138. One appropriate tool for chamfering the edge of the passageway is a rotary grinding tool. After the valve seat 140 is defined in the outlet coupler 112, the outlet coupler 112 is then attached to the safety valve housing at step 310.

At step 312, the maker provides a spring 132 designed in accordance with the method shown in FIG. 5 and inserts the spring 132 into the safety valve housing 102 against the outlet coupler 112.

At step 314, the maker provides and assembles a piston assembly 144. The piston assembly 144 includes the shaft 122, the valve stem 136, the first piston 114, the second piston 116, and the stop 138. In one embodiment, the piston assembly 144 is cast as a unitary casting, with the orifices 142 defined in the casting. In a second embodiment, the piston assembly 144 is cast as a unitary casting and the orifices 142 are drilled into the unitary casting.

Figure 7:
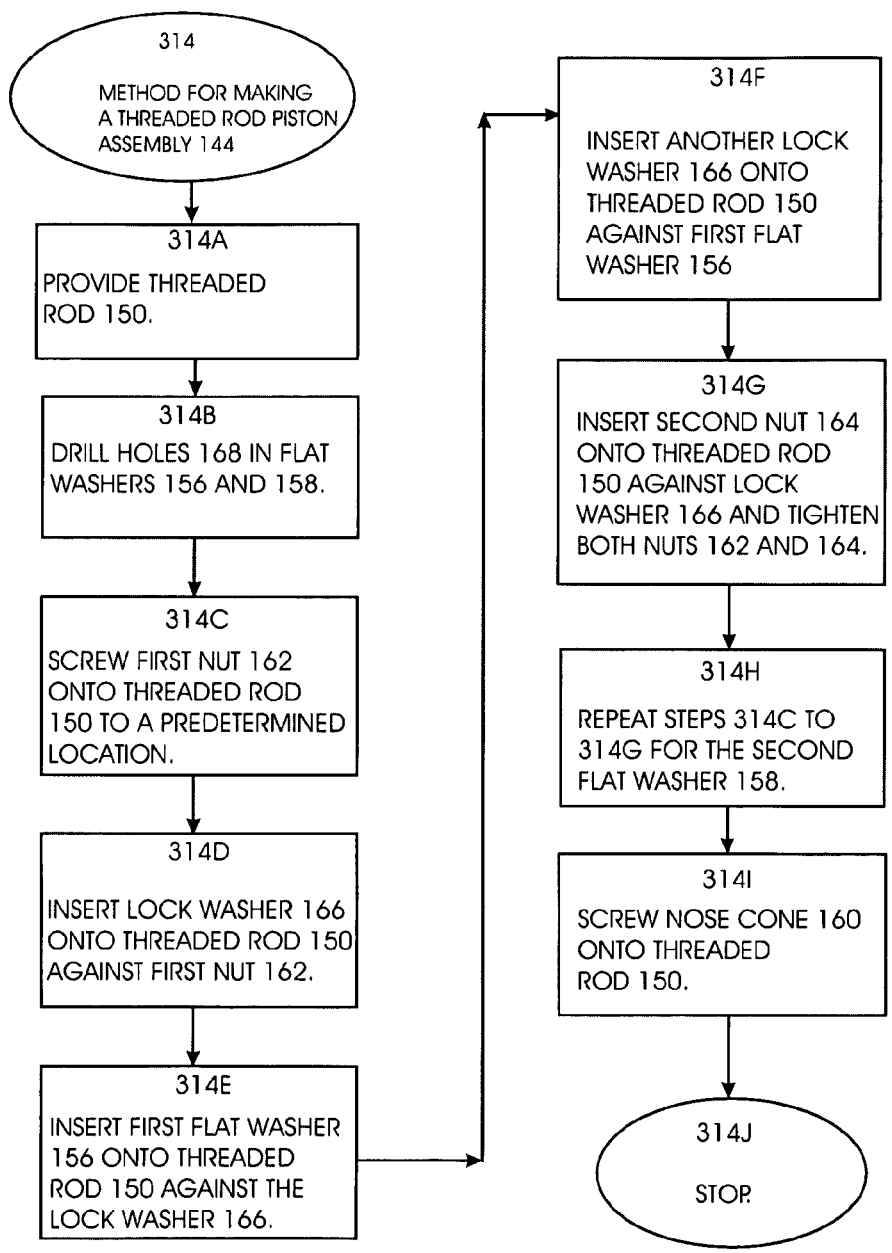
FIG. 7 is a flow chart for assembling a piston assembly on a threaded rod in accordance with a preferred embodiment of the present invention.

FIG. 7 is a flow chart for yet another embodiment of a method for performing step 314 in FIG. 6. Referring briefly to FIG. 7, the method begins at step 314A. At step 314B, a threaded rod 150 is provided for attachment of several components of the piston assembly 144. At step 314B, the flat washers 156 and 158 are drilled to define holes 168. At step 314C, the first nut 162 is screwed onto the threaded rod 150 to a predetermined thread location. At step 314D, the lock washer 166 is inserted on the threaded rod 150 against the first nut 162. At step 314E, the first flat washer 156 is inserted onto the threaded rod 150 against the lock washer 166. At step 314F, a second lock washer 166 is inserted onto the threaded rod against the first flat washer 156. At step 314G, the second nut 164 is screwed onto the threaded rod 150 and tightened against the second lock washer 166. At step 314H, the steps 314C through 314G are then repeated for the second flat washer 158 to attach the second flat washer 158 to the threaded rod 150 at a predetermined location. At step 314I, the internally threaded nose cone 160 is screwed onto the threaded rod 150. The method stops at step 314J and the making of the piston assembly 144 is complete.

Returning to FIG. 6, at step 316, the maker inserts the piston assembly 144 into the safety valve housing 102 against the spring 132. At step 318, the inlet coupler 110 is screwed into the safety valve housing 102. A length $L_{PA}$ of the piston assembly 144 and the spring length $L_{SP}$ should be selected so that the inlet coupler 110 slightly compresses the spring 132 when the inlet coupler 110 is screwed into the safety valve housing 102. It is in attaching the inlet coupler 110 that the preload is applied by the amount that the inlet coupler 110 is screwed into the threads on the housing 102.

At step 320, the safety valve 100 is attached to the inlet piping 106 and the outlet piping 108 to complete the installation of the safety valve 100 in the piping system. For each attachment of the safety valve 102 to the inlet coupler 110, and the outlet coupler 112, and for the attachment of the inlet coupler 110 and the outlet coupler 112 to the upstream piping 106 and the downstream piping 108, it is recommended that the attachment be made using a wrench that fits onto two of the flat sides 115 of the hexagonal portion of the inlet coupler 110 and the outlet coupler 112. The method stops at step 322.

Figure 8:
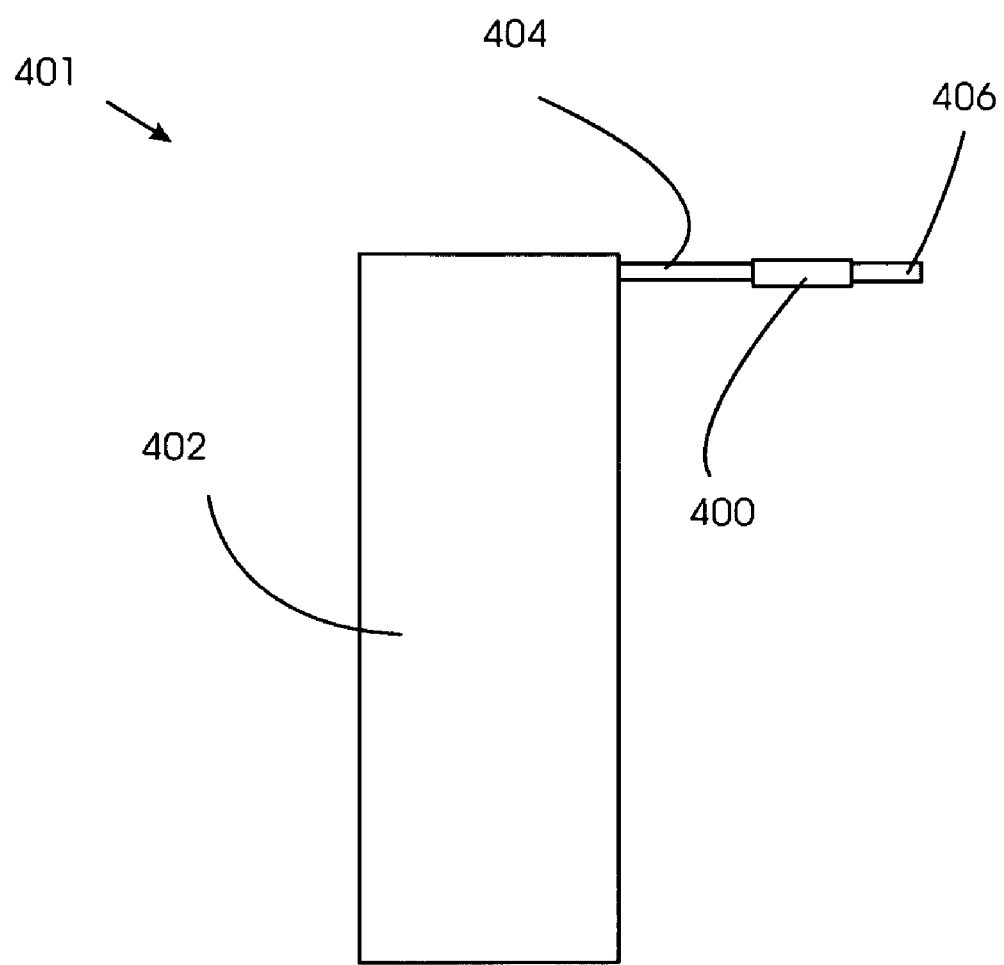
FIG. 8 is a schematic representation of a safety valve of the present invention installed on a gasoline pump.

FIG. 8 shows a schematic representation of a gasoline dispensing system 401, with a safety valve 400 of the present invention installed at a gasoline pump 402. Gasoline exits the gasoline pump 402 via the pump exit piping 404. The exit piping 404 acts as the inlet piping 106 to the safety valve 100 shown in FIGS. 1-2. Gasoline exits the safety valve 400 through the safety valve outlet piping 406, which is connected to a flexible hose. The safety valve 400 is configured internally exactly like the safety valve 100, and acts to shut off the flow of gasoline when there is a break in the piping downstream of the safety valve 400. Thus, a catastrophic failure occurs downstream of the safety valve 400 occurs when a motorist drives off from the gasoline pump 402 with a fill nozzle still in his automobile gasoline tank. When the catastrophic failure occurs, the safety valve 400 shuts down the flow of gasoline to the nozzle.

Although the example shown in FIG. 8 and discussed in the preceding paragraph is for a gasoline pump, the same principles apply to a fill station for an LP gas tank.

Figure 9:
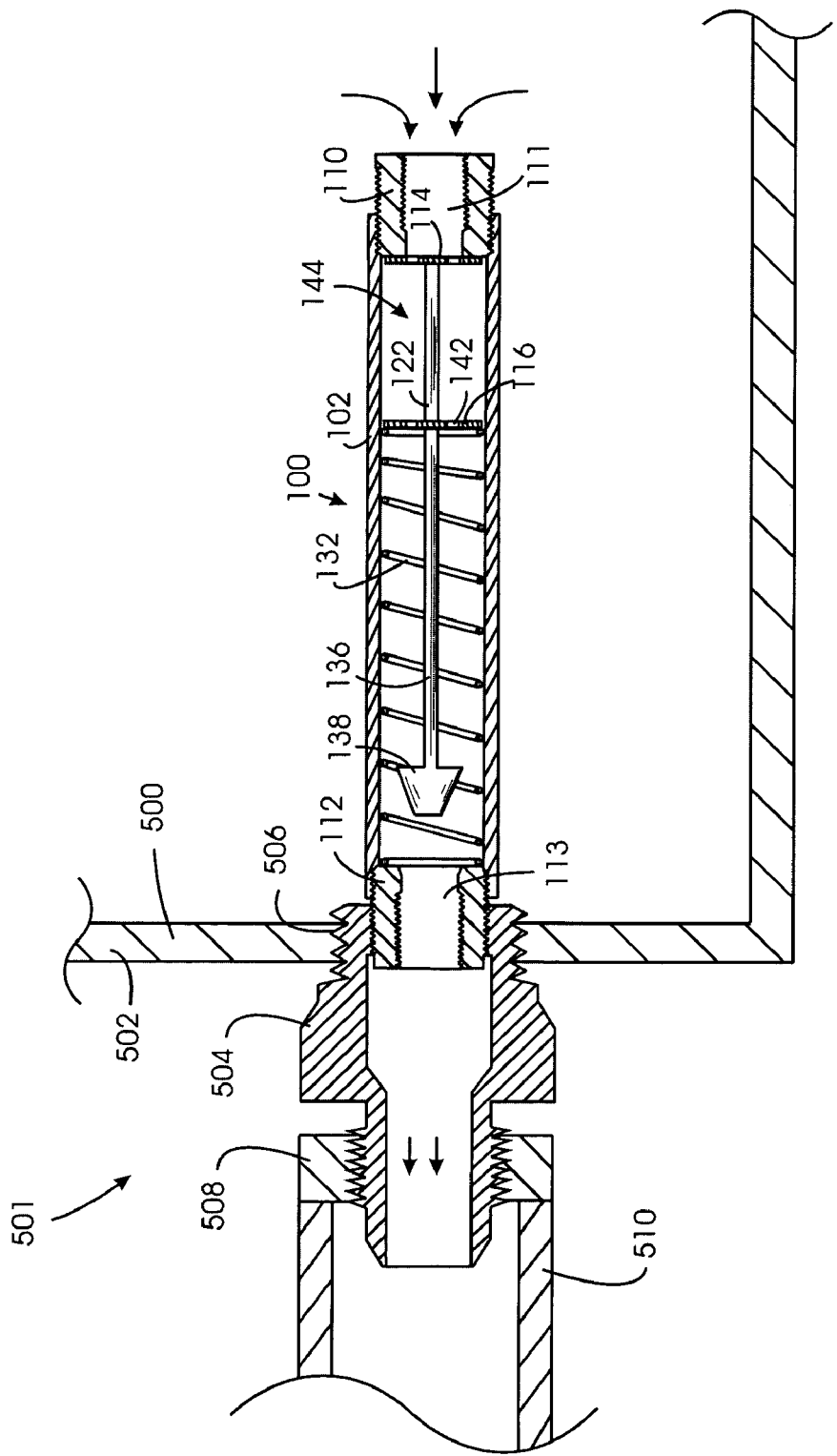
FIG. 9 is a partial cross-sectional view of a fuel spill prevention system constructed in accordance a preferred embodiment of the present invention.

FIG. 9 is a partial cross-sectional view of a spill prevention system 501 having a safety valve 100 installed in one of two fuel tanks 500 of a truck, where the safety valves 100 are in an opposed relationship with one another. The safety valve 100 shown in FIG. 9 is identical to the embodiment shown in FIGS. 1-2 between the inlet coupler 110 and the outlet coupler 112. The inlet piping 106 of FIGS. 1-2 is not necessary because the safety valve 100 is immersed in the fuel of the fuel tank 500. Furthermore, instead of being connected to outlet piping 108 as in FIGS. 1-2, the outlet coupler 112 is connected to a reducer fitting 504 that penetrates a wall 502 of the fuel tanks 500.

The reducer fitting 504 is threaded externally at both ends and is threaded internally at the end having a larger diameter than its other end. The outlet coupler 112 screws into the internal threads of the reducer fitting 504. The reducer fitting 504 screws into threads defined in a tank wall 502 and connects to a connecting line 510. The connecting line 510 is connected to the reducer fitting 504 by a hose coupler 508, which is in turn attached to the connecting line 510.

Figure 10:
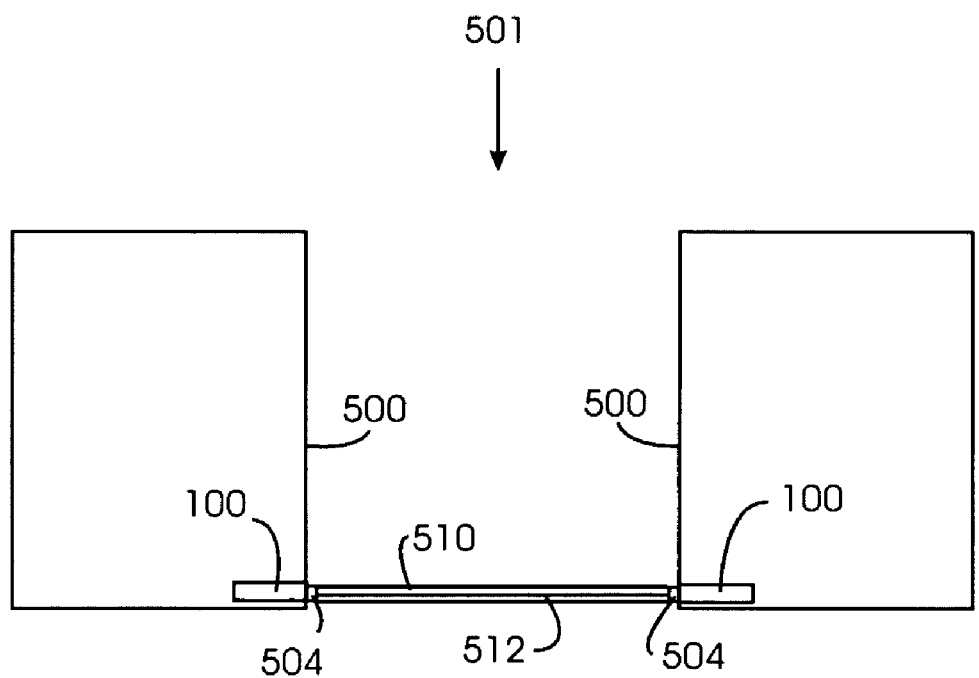
FIG. 10 is an side elevation view of a fuel spill prevention system constructed in accordance with a preferred embodiment of the present invention.

As best seen in FIG. 10, the connecting line 510 extends from the reducer fitting 504 on one fuel tank 500 to a like reducer fitting 504 on a second fuel tank 500. The second fuel tank 500 has a safety valve 100 configured exactly like the safety valve 100 on the first fuel tank 500 shown in FIG. 9. A trip wire 512 is attached to the connecting line 510. The trip wire 512 is connected to the electrical system of the truck and is configured to indicate to a truck driver in a cab of the truck whenever the trip wire 512 is broken.

In operation, fluid is allowed to pass through the safety valves 100 and the connecting line 510 under normal operating conditions to evenly draw fuel from both tanks 500. This is desirable because an unbalanced load on a truck may cause the truck to have an accident. This allows fuel to flow from one tank 500 to another tank 500 if there is a difference in the amount of fuel in each tank 500. The pressure driving the flow would be the incremental static head pressure that occurs in one tank 500 when that tank 500 has more fuel than the other tank 500. The restriction due to opposing safety valves 100 causes the fuel transfer rate to be lower than the critical flow rate that would cause one of the safety valves 100 to close.

However, if the connecting line 510 breaks or is detached from one of the reducer fittings 504, each safety valve 100 senses the change in flow rate through each safety valve 100, by way of the increased the pressure difference between each safety valve's inlet coupler 110 and its respective outlet coupler 112, which causes each safety valve 100 to close. As discussed above for the safety valve 100, with all other dimensions of the safety valve 100 being constant, the spring constant K, the number of orifices 142, and the size of the orifices 142 can be varied to produce a safety valve 100 that closes at a precise flow rate. The precision with which the safety valve 100 operates is largely due to the fact that the piston assembly 144 can be designed to have a very low mass.

For the embodiment shown in FIGS. 9-10, the fuel tanks 500 could contain any liquid and would be referred to simply as liquid storage tanks if the liquid storage tanks did not contain fuel. Furthermore, the fuel tanks 500, the connecting line 510 and the spill prevention system 501 may be collectively referred to as a fuel tank system or a containment system.

The connecting line 510 may be a flexible hose or a rigid conduit. The material which the connecting line 510 is made from is determined by the particular liquid that is contained in the liquid storage tanks. If the connecting line 510 is a flexible hose, suitable materials from which to make the flexible hose include rubber, plastic, and other flexible materials. If the connecting line 510 is a rigid conduit, suitable materials for the rigid conduit include steel, aluminum, rigid plastics, and various alloys thereof.

Figure 11:
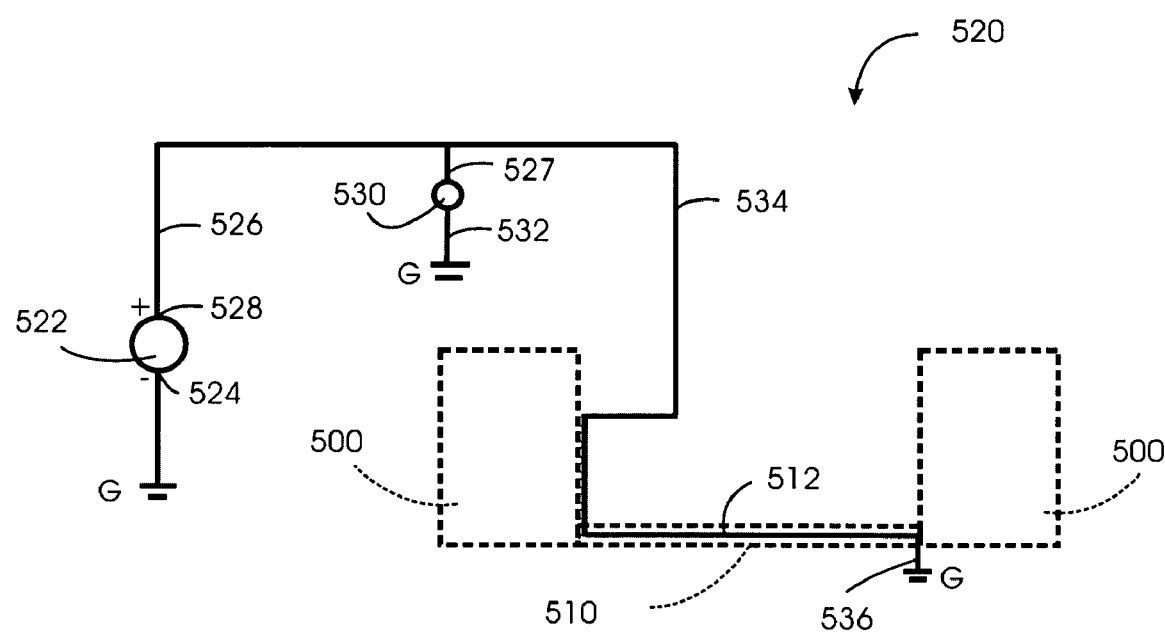
FIG. 11 is a circuit schematic view of an alert system constructed in accordance a preferred embodiment of the present invention.

FIG. 11 shows an electrical schematic for an alert system 520 to be used in conjunction with the trip wire 512 to alert a driver of the truck that the trip wire 512 has been broken. In FIG. 11, electrical wiring for the alert system circuit 520 is shown by solid lines, while the fuel tanks 500 and the connecting line 510 extending between the fuel tanks 500 are shown by dotted lines. The alert system 520 is powered by the truck battery 522.

A negative terminal 524 of the battery 522 is connected to any suitable electrical ground for the alert system circuit 520, such as a frame element of the truck. An electrical wire 526 leads from a battery positive terminal 528 to a branch line 527 having a sensor and indicator device (indicator) 530. Another electrical wire 532 leads from the indicator 530 to the electrical ground for the alert system circuit 520. Yet another electrical wire 534 leads from the branch line 527 and is connected to a first end of the trip wire 512. Still another electrical wire 536 leads from a second end of the trip wire 512 to the electrical ground.

In operation, in normal operating conditions when the trip wire 512 is intact, electrical current passes through the trip wire 512 and the indicator 530 remains inactive. When the trip wire 512 is broken, the indicator 530 senses an increase in electrical current and activates to alert the truck driver that the trip wire 512 is broken. The indicator 530 may include a simple light a flashing light, or an audible signal that indicates to the driver that the trip wire 512 is broken.

Although only two fuel tanks 500 are shown in FIG. 10, it is clear to one skilled in the art that a third tank, or any number of tanks, may be added to the fuel tank system without changing the nature of the invention. This third tank may be connected to either one of the tanks 500 shown in FIG. 10 by connecting the third tank to one of the tanks 500 by a second connecting line. Similarly, a tee connection may be added to the connecting line 510, and the second connecting line may be connected to the connecting line 510 through the tee connection.

FIG. 12 shows a cross-sectional view of a cartridge insert valve 600 in an open position. The cartridge insert valve 600 (hereinafter "cartridge") includes a housing 602 with an inner wall 604. The housing 602 is made from a pipe of smaller diameter than a diameter of a piping segment in which the cartridge 600 is inserted.

A fluid such as natural gas flows through an inlet opening 606 defined in an inlet cap 608, into the housing 602 and, when the cartridge 600 is in the open position, though an outlet opening 610 defined in a seat cap 612. Both the inlet cap 608 and the seat cap 612 generally have a circular cross-sectional shape.

A disc-shaped first piston 614 and a disc-shaped second piston 616 are positioned in the housing 602, with piston outer walls 618 and 620 having diameters slightly smaller than a diameter of the housing inner wall 604. There are gaps between the piston outer walls 618 and 620 and the housing inner wall 604 that are generally small, but large enough to allow for free sliding of the pistons 614 and 616 within the housing 602. The pistons 614 and 616 are separated by a shaft 622. The first piston 614 has a downstream face 624 and an upstream face 626. The second piston 614 has a downstream face 628 and an upstream face 630.

A spring 632 is positioned in the housing 602 between a seat cap inner face 634 and the downstream face 628 of the second piston 616. The spring 632 resiliently restrains the sliding of the pistons 614 and 616 in the direction of the seat cap inner face 634.

A valve stem 636 extends from the second piston downstream face 628 to support a stop 638. The valve stem 636 is attached at a first end to the second piston 616 and at a second end to the stop 638. The valve stem 636 is rigidly attached to the second piston 616 so that movement of the second piston 616 causes a like movement of the valve stem 636 and the stop 638. A valve seat 640 is defined in the seat cap 612. The valve seat 640 is shaped and sized to receive the stop 638 to form a substantial fluid seal between the stop 638 and the valve seat 640. Orifices 642 are formed in the first piston 614 and the second piston 616.

A piston assembly 644 is defined to include the first piston 614, the second piston 616, the shaft 622, the valve stem 636 and the stop 638. The inlet cap 608 has a flange 646 that is an enlarged diameter portion, when compared to the diameter of the inlet cap shown in FIG. 1. The operation of the cartridge 600 in closing when there is excess fluid flow is identical to the operation of the safety valve 100 described above and further description of this operation is omitted.

FIG. 13 shows the cartridge 600 inserted into a pipe segment 650 of a piping system 652. As shown in FIG. 13, the inlet cap flange 646 acts to restrain the cartridge 600 from sliding further into the pipe segment 650. The flange 646 has a diameter slightly larger than an inside diameter of the pipe segment 650 in which it is positioned. In a typical installation, threads on an end of the pipe segment 650 mate with threads on one end of a pipe collar (not shown) to attach the pipe segment to an upstream portion of the piping system 652. A joint formed between the flange 646 and an end of the pipe segment 650 should be sealed to prevent the escape of a fluid flowing through the piping system. The joint may be sealed by positioning a sealant between the flange 646 and the end of the pipe segment 650, such as an O-ring or another appropriate sealant. Although the pipe segment is shown in a horizontal orientation in FIG. 13, the pipe segment may have any orientation. In particular, in one typical installation the pipe segment is a vertical riser located downstream of a gas meter. However, the cartridge may be inserted into any portion of the piping system, including an end of the piping system near a gas appliance, which is typically flexible tubing.

The cartridge may be made from any appropriate material, including steel, stainless steel, copper, brass, plastic, polymers, metallic alloys, composite materials and combinations thereof.

In the following, a method is described for installing a cartridge in a gas pipe to protect an existing residence or business (collectively referred to as "building"). The first step in the method is having an installer close a shutoff valve upstream of the gas meter. Next, the installer disconnects the gas supply pipe that normally connects the building to the meter. This connection is downstream of the gas meter. Typically, this gas supply pipe is a vertical riser attached to the upstream portion of the piping system by a collar that engages threads on the vertical riser. Thus, the installer disconnects the gas supply pipe by rotating the pipe collar. At this point the installer may simply insert the cartridge 600 into the gas supply pipe with the seat cap inserted first. The cartridge 600 is prevented firm traveling too far into the pipe segment 650 by the inlet cap flange 646. Finally, the installer may simply reconnect the gas supply pipe to the gas meter and opens the shutoff valve upstream of the gas meter. For this installation method of a cartridge 600 in a piping system, no removal of pipe segments is required and the cartridge 600 easily retrofits into a piping system.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

TABLE 1

| DIAMETER OF EACH ORIFICE (cm) | | | |
|---|---|---|---|
| Number of Orifices in Each Piston | Spring Constant (N/m) | | |
| | 0.5 | 1.0 | 2.0 |
| 2 | A | B | C |
| 3 | D | E | F |
| 4 | G | H | I |

TABLE 2

| SPRING CONSTANT [N/m] | | | |
|---|---|---|---|
| CRITICAL FLOW RATE [CUBIC METERS/HR] | ORIFICE SIZE (SQ. CM.) | | |
| | 0.2 | 0.4 | 0.5 |
| 5 | A | B | C |
| 6 | D | E | F |
| 7 | G | H | I |

What is claimed is:

1. A cartridge insert valve to prevent excess flow through a pipe segment of an existing piping system, wherein the cartridge insert valve is positioned in one end of the pipe segment, the cartridge insert valve comprising:
   (a) a cylindrical housing;
   (b) an inlet cap with an inlet opening defined therein, wherein the inlet cap is positioned on a cylindrical housing first end;
   (c) a seat cap with an opening defined therein, wherein the seat cap is positioned on a cylindrical housing second end opposite the cylindrical housing first end; and
   (d) a piston assembly that shuts off flow through the valve in response to excess flow through the valve, wherein the piston assembly is located in the cylindrical housing, and wherein the cartridge insert valve is located inside the pipe segment such that a fluid flowing through the pipe segment enters the inlet cap opening, flows through the cylindrical housing and exits the seat cap opening.

2. The cartridge insert valve of claim 1 wherein the inlet cap comprises a flange having a diameter slight larger than an inside diameter of the pipe segment in which it is positioned to restrain the cartridge from sliding further into the pipe segment.

3. The cartridge insert valve of claim 2 wherein the piston assembly comprises:
(a) a first disc-shaped piston having a diameter slightly smaller than a diameter of the cylindrical housing such that the first piston slides freely within the housing, wherein the first piston has at least one orifice defined therein, and wherein the first piston has an upstream face and a downstream face;
(b) a second disc-shaped piston positioned downstream from the first disc-shaped piston, the second disc-shaped piston having a diameter substantially equal to the first piston diameter, wherein the second piston has at least one orifice defined therein, wherein the second piston has an upstream face and a downstream face, and wherein fluid entering the cylindrical housing exerts a fluid force on the first piston and the second piston in the direction of fluid flow;
(c) a shaft connecting the first piston to the second piston;
(d) a valve stem extending from the downstream face of the second piston, wherein the second piston is attached to a first end of the valve stem; and
(e) a stop attached to a second end of the valve stem.

4. The cartridge insert valve of claim 3 wherein the seat cap comprises a valve seat, and wherein the valve seat is substantially shaped and sized to matingly receive the stop.

5. The cartridge insert valve of claim 4 further comprising a spring positioned in the housing against a downstream face of the second piston such that the spring exerts a spring force on the second piston in a direction opposite the direction of fluid flow, wherein when fluid forces acting on the piston assembly sufficiently exceed the spring force acting on the downstream face of the second piston, the piston assembly moves in the direction of fluid flow until the stop engages the valve seat and substantially shuts off the fluid flow through the pipe.

6. The cartridge insert valve of claim 5 wherein the stop has a substantially frustro-conical shape.

7. The cartridge insert valve of claim 6 wherein the seat cap opening is substantially frustro-conical in shape to matingly receive the stop.

8. The cartridge insert valve of claim 1 wherein the cartridge insert valve is made from a material selected from a group of materials consisting of steel, stainless steel, copper, brass, plastic, polymers, metallic alloys and composite materials.

9. A piping system for transporting gas to a building, the system comprising:
(a) one or more pipe segments; and
(b) the cartridge insert valve of claim 1.

10. A method for installing a cartridge insert valve in a gas supply pipe to prevent an excess gas flow in a gas piping system for a building, wherein the gas piping system has a gas meter and a gas shutoff valve upstream from the gas meter, the method comprising the steps of:
(a) closing the gas shutoff valve;
(b) disconnecting a gas supply pipe connected to the gas meter on the downstream side of the gas meter;
(c) inserting the cartridge insert valve into the gas supply pipe;
(d) reconnecting the gas supply pipe to the gas meter; and
(e) opening the gas shutoff valve,
wherein the cartridge insert valve comprises:
(i) a cylindrical housing;
(ii) an inlet cap with an inlet opening defined therein, wherein the inlet cap is positioned on a cylindrical housing first end;
(iii) a seat cap with an opening defined therein, wherein the seat cap is positioned on a cylindrical housing second end opposite the cylindrical housing first end; and
(iv) a piston assembly that shuts off flow through the valve in response to excess flow through the valve, wherein the piston assembly is located in the cylindrical housing, and wherein the cartridge insert valve is located inside the gas supply pipe such that a fluid flowing through the gas supply pipe enters the inlet cap opening, flows through the cylindrical housing and exits the seat cap opening,
wherein the inlet cap comprises a flange having a diameter slightly larger than an inside diameter of the gas supply pipe in which it is positioned to restrain the cartridge from sliding further into the gas supply pipe,
wherein the piston assembly comprises:
(A) a first disc-shaped piston having a diameter slightly smaller than a diameter of the cylindrical housing such that the first piston slides freely within the housing, wherein the first piston has at least one orifice defined therein, and wherein the first piston has an upstream face and a downstream face;
(B) a second disc-shaped piston positioned downstream from the first disc-shaped piston, the second disc-shaped piston having a diameter substantially equal to the first piston diameter, wherein the second piston has at least one orifice defined therein, wherein the second piston has an upstream face and a downstream face, and wherein fluid entering the cylindrical housing exerts a fluid force on the first piston and the second piston in the direction of fluid flow;
(C) a shaft connecting the first piston to the second piston;
(D) a valve stem extending from the downstream face of the second piston, wherein the second piston is attached to a first end of the valve stem; and
(E) a stop attached to a second end of the valve stem.

11. The method of claim 10 wherein the seat cap comprises a valve seat, and wherein the valve seat is substantially shaped and sized to matingly receive the stop.

12. The method of claim 10 wherein the cartridge insert valve further comprises a spring positioned in the housing against a downstream face of the second piston such that the spring exerts a spring force on the second piston in a direction opposite the direction of fluid flow, wherein when fluid forces acting on the piston assembly sufficiently exceed the spring force acting on the downstream face of the second piston, the piston assembly moves in the direction of fluid flow until the stop engages the valve seat and substantially shuts off the fluid flow through the pipe.

13. The method of claim 10 wherein the stop has a substantially frustro-conical shape.

14. The method of claim 10 wherein the seat cap opening is substantially frustro-conical in shape to matingly receive the stop.

15. The method of claim 10 wherein the cartridge insert valve is made from a material selected from a group of materials consisting of steel, stainless steel, copper, brass, plastic, polymers, metallic alloys and composite materials.

16. The method of claim 10 wherein an end of the cartridge insert valve at which the seat cap is positioned is inserted into the gas supply pipe first.

17. A gas piping system with a cartridge insert valve installed by the method of claim 10.

18. A cartridge insert valve to prevent excess flow through a pipe segment of an existing piping system without adding extra length of piping to the piping system, wherein the cartridge insert valve is positioned in one end of the pipe segment, the cartridge insert valve comprising:
(a) a cylindrical housing;
(b) an inlet cap with an inlet opening defined therein, wherein the inlet cap is positioned on a cylindrical housing first end;
(c) a seat cap with an opening defined therein, wherein the seat cap is positioned on a cylindrical housing second end opposite the cylindrical housing first end; and
(d) a piston assembly that shuts off flow through the valve in response to excess flow through the valve, wherein the piston assembly is located in the cylindrical housing, and wherein the cartridge insert valve is located inside the pipe segment such that a fluid flowing through the pipe segment enters the inlet cap opening, flows through the cylindrical housing and exits the seat cap opening.

* * * * *